Nov. 7, 1950 — A. L. HENRY — 2,528,828
APPLIANCE FOR CORRECTING EXAMINATION PAPERS
Filed Jan. 27, 1947 — 2 Sheets-Sheet 1
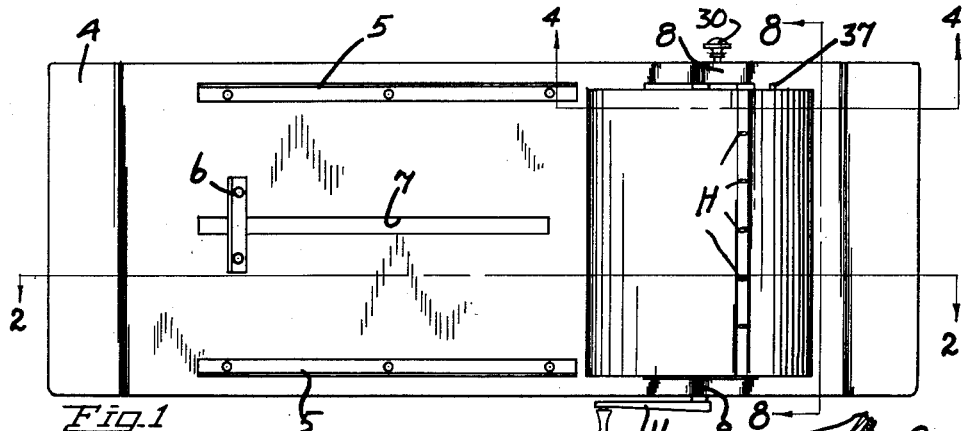
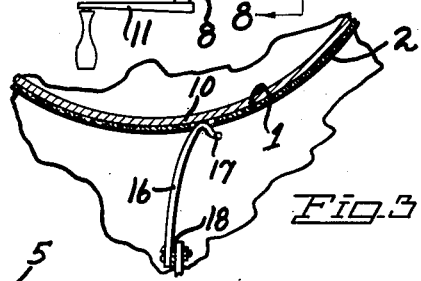
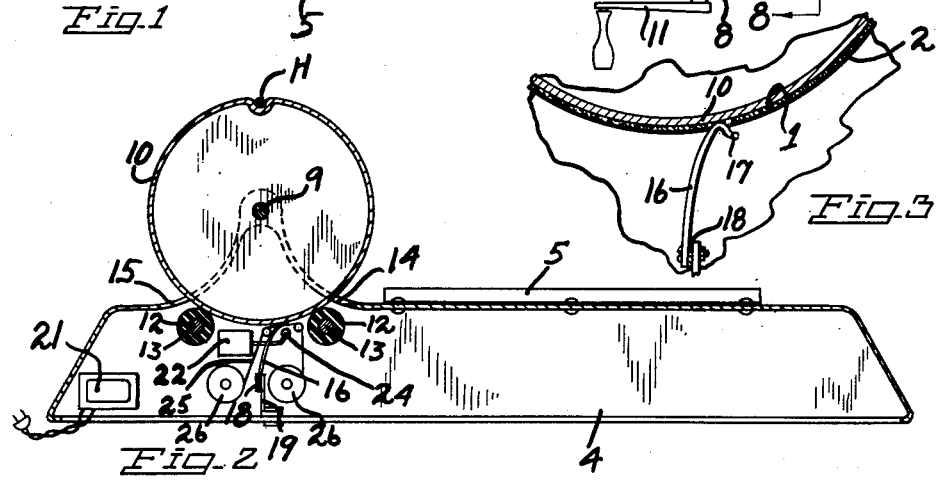
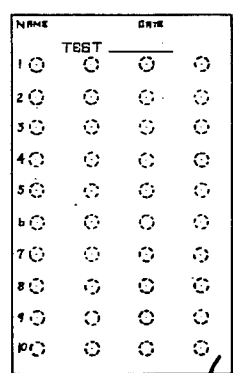
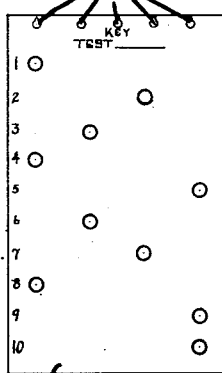
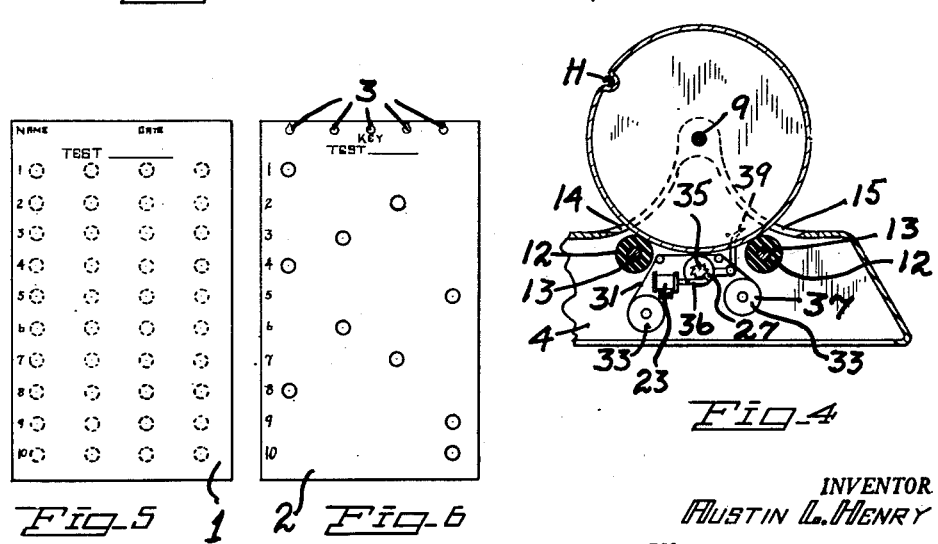
INVENTOR
AUSTIN L. HENRY
BY Glenn L. Fish
ATTORNEY Nov. 7, 1950  A. L. HENRY  2,528,828
APPLIANCE FOR CORRECTING EXAMINATION PAPERS
Filed Jan. 27, 1947  2 Sheets-Sheet 2
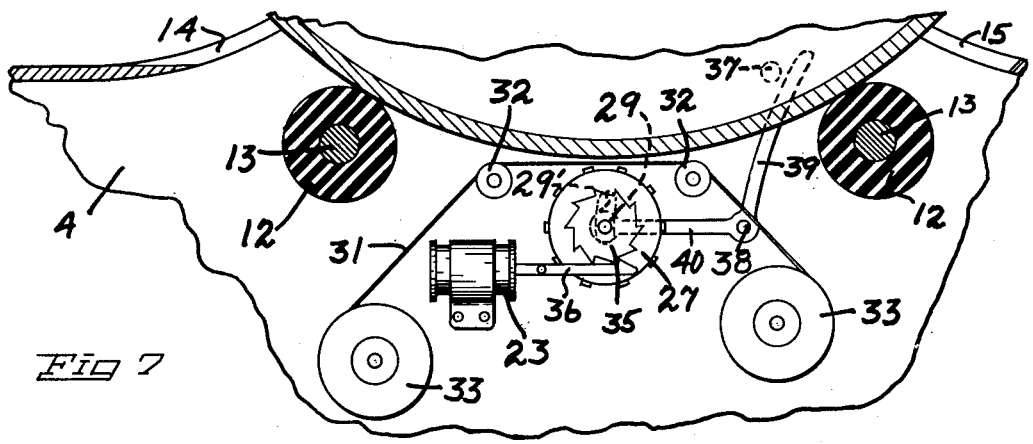
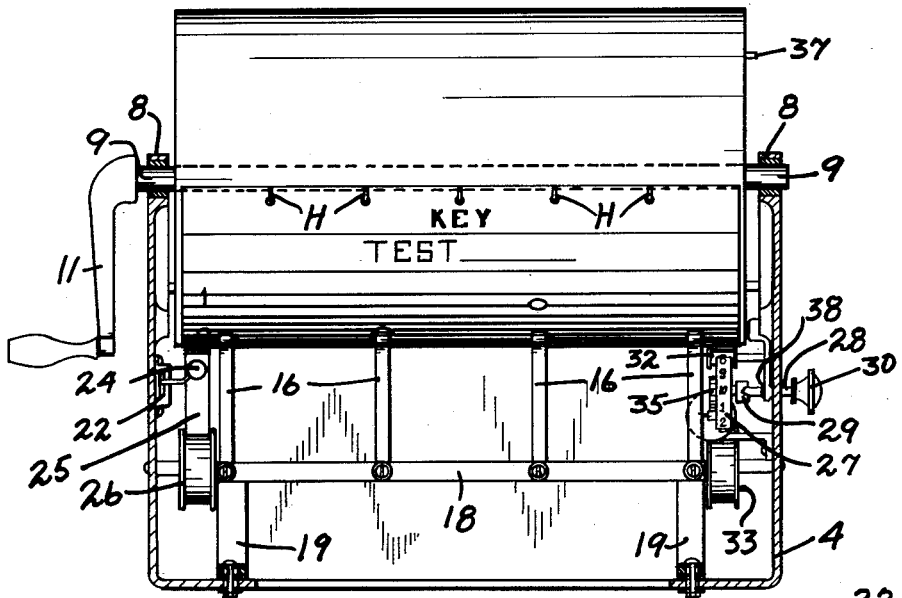
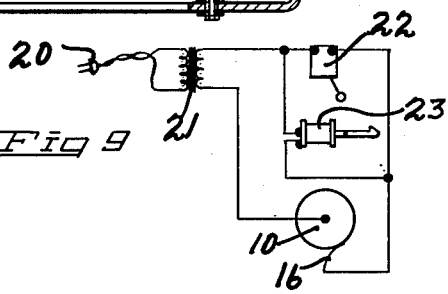
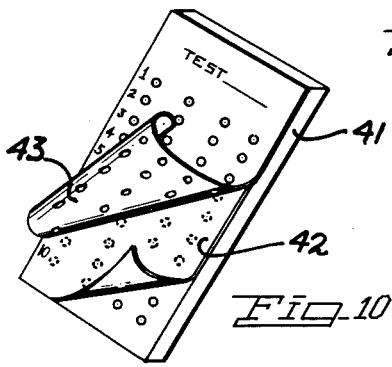
INVENTOR
AUSTIN L. HENRY
BY
Glenn L. Fish
ATTORNEY Patented Nov. 7, 1950

2,528,828

UNITED STATES PATENT OFFICE 2,528,828

APPLIANCE FOR CORRECTING EXAMINATION PAPERS

Austin L. Henry, Spokane, Wash.

Application January 27, 1947, Serial No. 724,491

1 Claim. (Cl. 35—48)

My present invention relates generally to the broad class of education appliances, and more specifically to an improved Appliance For Correcting Examination Papers of the type employing test questions that have two or more choices, only one of which is correct.

In carrying out my invention I employ a key card or answer card having a number of columns of perforations, and a column of numbers identifying the perforations, as correct answers. In combination with this answer card or perforated key card or sheet I utilize a complementary student's test card which is provided with the same number column for the answers, and is punched by the student to denote his answers.

If the punched holes in the student's test card correspond to and register with the perforations in the answer card or key card, all of the answers are correct. If a punched hole does not register with the correct perforation of the key card, the student's answer is incorrect.

To facilitate accurate examination and testing of the student's test cards, the student's card and a perforated key card are fed into a preferably hand operated and electrically controlled rotary machine and inked ribbon appliance that is adapted to announce by an audible signal a correct answer and to imprint a correct mark on one margin of the student's card. A rotary numbering device, electrically controlled is also utilized to imprint the number of correct answers on another margin of the student's card.

The invention consists in certain novel features of construction and combinations and arrangements of parts as will hereinafter be more fully described and specifically set forth in my appended claim.

In the accompanying drawings I have illustrated one complete example of a physical embodiment of my invention wherein the parts are combined and arranged in accord with one mode I have devised for the practical application of the principles of my invention; but it will be understood that various changes and alterations are contemplated and may be made in these exemplifying drawings and mechanical structures, within the scope of my claim without departing from the principles of the invention.

Figure 1 is a top plan view of a manually operated appliance embodying my invention; and Figure 2 is a vertical longitudinal sectional view at line 2—2 of Fig. 1.

Figure 3 is an enlarged detail vertical sectional view showing a portion of the rotary drum, and the relation thereto of one of the spring bars or electrical contact fingers.

Figure 4 is a vertical longitudinal sectional view at line 4—4 of Fig. 1 illustrating the numbering mechanism.

Figure 5 is a face view of the student's answer card or test card; and Figure 6 is a similar view of the key card used therewith.

Figure 7 is an enlarged fragmentary vertical sectional view showing the electrically controlled numbering mechanism and inked ribbon in their relation to the rotary drum.

Figure 8 is an enlarged transverse sectional view at line 8—8 of Fig. 1 showing one of the key cards attached to the drum, and the relation thereto of the electrical control fingers.

Figure 9 is a wiring diagram of the electrical controls and circuits utilized in the appliance; and Figure 10 is a perspective view of a modified form of testing device including the use of a portable, or hand manipulated board with the two examination cards mounted thereon, for single use in a classroom.

In order that the utility of the invention may readily be understood I have shown in Fig. 5 a student's answer card 1, which may be a sheet of paper of predetermined size and shape that is provided at its left margin with a column of figures from one to ten designating the number of questions or answers in the examination or test. The card is also provided with a number of columns (here shown as four) of dotted circles, one of which is to be punched by the student in answering each of the numbered questions.

In Fig. 6 the test card 2 is provided with the same column of numbers, and the ten correct answers are indicated by ten perforations in this card; and in addition this key card is provided with a transverse row of holes 3 across its top edge by means of which the key card is attached to the rotary drum of the appliance.

The punched test card and the perforated key card are first alined and then fed to the rotary machine or appliance that is mounted upon an open bottom hollow base 4 upon the flat top of which a pair of longitudinal guide strips 5, 5 are secured, and an adjustable transversely arranged guide 6 is movable along the slot 7. A number of the answer cards are arranged in a pile on the flat top and guided, successively, to the rotary drum of the appliance.

Near one end of the flat top of the hollow base is provided a slot and the elevated side walls of the base are fashioned with spaced lateral bearings 8, 8, for the journal ends 9 of a transversely arranged shaft on which the metallic rotary drum or cylinder 10 is rigidly mounted, and a crank handle 11 is utilized to rotate or revolve the shaft and its drum.

Within the hollow base and below the drum as it projects through the slotted top of the base, a pair of longitudinally spaced rubber feed rollers 12, 12, are mounted for co-action with the drum in passing the cards through the machine, and the ends of the roller-spindles 13 are journaled in suitable bearings in the side walls of the base.

The key card or paper key 2, with its predetermined perforations, is attached to the exterior periphery of the drum by engaging its holes 3 over complementary pins or hooks H mounted on the drum, and the answer cards or student cards are successively fed along the guides 5, 5 through an inlet opening 14. The cards pass between the drum and the first feed roller, and then between the second feed roller and drum, and after being marked the answer card or student's card is passed out through the outlet opening 15, the key card of course remaining on the drum.

For use with the four column key card and test card the appliance is equipped with a corresponding number of laterally spaced upright spring contact bars or electrical fingers 16, each of which is provided with a contact head 17 at its upper free end, and the bars at their lower ends are fastened to a cross bar 18 that is supported from the flanged bottom of the base by upright brackets 19, 19.

When the drum is revolved by operating the hand crank and if the spring pressed contact head 17 encounters a hole punched in the test card that registers with a predetermined perforation in the key card, the head 17 protruding through this opening contacts with the metallic cylinder or drum, and completes an electrical operating circuit indicated in the wiring diagram of Fig. 9, to indicate a correct answer to a specific question.

This circuit may be plugged in at 20 to a conventional outlet box, and it includes a transformer 21, an audible signal or buzzer 22, and a solenoid magnet 23.

The buzzer 22 is provided with a spring arm or clapper having a striking head 24, and it is mounted on the inner face of one of the side walls of the base with the striking head located beneath the working flight of an inked ribbon 25 that is supported on and reeled to and from a pair of supported spools 26, 26 journaled on the side wall of the base.

When the buzzer is energized, due to the closing of its circuit by contact of the electrical finger with the metallic drum, which is grounded in the circuit, the striking head 24 hits the underside of the inked ribbon and by impact causes a black mark to be imprinted on the margin of the student's test card and this mark corresponds with the correctly punched answer.

When a contact finger closes the electrical circuit an intermittently actuated number wheel 27 is actuated for a single short movement by the solenoid 23. This wheel is provided with ten circumferentially spaced numbers or types corresponding to the column of numbers on the cards, and it is located within one side of the hollow base, beneath the drum, in order that the total number of correct answers may be imprinted on another margin of the student's test card.

This rotary printing wheel is mounted upon a shaft 28 that is journaled in a bearing bracket 29 which is pivotally mounted on the inner face of a side wall of the base at 30, and the operating end of the shaft which projects to the exterior of the base through slot 29' is provided with a handle or knob 30 by means of which the wheel may be initially set, and re-set, after each card has been tested, as required.

Between the printing wheel and the lower periphery of the drum an inked ribbon 31 is suspended between spaced guide rollers 32, 32, which have journal bearings in the side walls of the base, and the inked ribbon is fed to and from a pair of conventional spools 33, 33, also journaled in bearings of the side walls of the base.

For intermittently imparting a rotary movement to the printing wheel it is equipped with a rack gear 35, and the solenoid, when energized, is designed to turn the rack gear one notch, by means of a pawl 36 that is operatively mounted on the solenoid or magnet.

With the recording of each correct answer the printing wheel is given a partial turn and with its final turn the uppermost type-number on the wheel corresponds with the number of correct answers made by the student as indicated by the holes punched in his card. While in this position the wheel is lifted to cause an imprint of its uppermost number on the student's card, and through the inked ribbon.

For this lifting operation and printing action of the wheel, the drum, at one end is equipped with a projecting pin or lug 37; and a bell crank lever is pivoted at 38 on the inner face of the side walls of the hollow base. One arm 39 of the bell crank lever projects upwardly into the circular path of movement of the pin or lug 37, and the other arm 40 of the bell crank lever encircles, or has a bearing 29 on the wheel shaft 28. Thus when pin 37 strikes the lever arm 39 this arm is depressed and the supporting arm 40 is elevated to lift the wheel shaft 28, carrying the wheel with it, and the number on the wheel by impact against the ribbon prints the total number of correct answers on the student's test card.

After this operation the examined test card is fed out through the outlet slot or opening 15, the machine or appliance is re-set, and a succeeding test card is fed to, and passed through the appliance.

As shown in Fig. 10, a backing board 41 may be provided for the student to aid in locating the holes to be punched in proper spacing and allowing the use of paper 42 not previously scored by placing a guide 43 on top and punch the proper holes with a pencil or stick.

For illustrative purposes I have described the operation of the appliance in connection with correct answers to the questions in an examination or test, but it will be understood that changes and variations may be made in these operations, if desired. For instance, in lieu of recorded correct questions, the wrong or incorrect answers may be recorded, and obviously, if no incorrect answers have been punched by the student, the punched holes will not line up with perforations, no contacts can be made, and the printing wheel will remain in initial position for each card or paper.

Then, when pin 37 strikes the lever arm 39, the printing wheel will print the total number of correct answers on the card. Thus the appliance may be arranged and adapted to count and denote either the correct answers, or the incorrect answers, as desired.

Having thus fully described my invention, what I claim as new and desire to secure by Letters Patent is:

In an educational appliance having an open electrical circuit, the combination with a rotary drum and operating means therefor, and friction feed rollers coacting with the lower periphery of the drum to convey a perforated card, of a resiliently mounted conductor finger adapted to coact with the perforated card and contact the drum for closing the circuit, an inked ribbon supported beneath the lower periphery of the drum and means for feeding said ribbon, a printing wheel journaled in operative position beneath the ribbon, electromagnetic means for intermittently rotating the printing wheel, an actuating pin carried by the drum, a bell-crank lever having a depressible arm in the path of the pin, and a lifting arm of the lever coacting with the wheel to lift the latter for an imprint on the card.

AUSTIN L. HENRY.

REFERENCES CITED

The following references are of record in the file of this patent:

UNITED STATES PATENTS

| Number | Name | Date |
|---|---|---|
| 834,365 | Darlington | Oct. 30, 1906 |
| 2,027,033 | Ford | Jan. 7, 1936 |
| 2,048,976 | Sveda | July 28, 1936 |
| 2,053,069 | Daly | Sept. 1, 1936 |
| 2,294,416 | Mentzer | Sept. 1, 1942 |